United States Patent
Lee et al.

(10) Patent No.: US 7,526,185 B2
(45) Date of Patent: Apr. 28, 2009

(54) INFORMATION STORAGE MEDIUM AND METHOD OF RECORDING AND/OR REPRODUCING DATA THEREON

(75) Inventors: Kyung-geun Lee, Gyeonggi-do (KR); Jung-wan Ko, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 833 days.

(21) Appl. No.: 10/798,284

(22) Filed: Mar. 12, 2004

(65) Prior Publication Data

US 2004/0184396 A1  Sep. 23, 2004

Related U.S. Application Data

(60) Provisional application No. 60/454,617, filed on Mar. 17, 2003.

(30) Foreign Application Priority Data

Mar. 17, 2003  (KR) .................. 10-2003-0016497

(51) Int. Cl.
*H04N 5/91* (2006.01)
*H04N 5/82* (2006.01)
(52) U.S. Cl. .................. 386/83; 386/125; 386/126
(58) Field of Classification Search .................. 386/95, 386/105, 83, 124, 125; 369/47.28, 59.25, 369/275.3
See application file for complete search history.

(56) References Cited

U.S. PATENT DOCUMENTS 6,072,759 A * 6/2000 Maeda et al. ............ 369/59.25
6,148,140 A * 11/2000 Okada et al. .............. 386/105
6,701,063 B1 * 3/2004 Komoda et al. ............ 386/95
6,894,961 B1 * 5/2005 Osakabe .................. 369/47.28

FOREIGN PATENT DOCUMENTS

JP  2000-293931  * 10/2000
KR  2001-11557    2/2001

OTHER PUBLICATIONS

U.S. Appl. No. 10/798,271, filed Mar. 12, 2004, Kyung-geun Lee et al.

* cited by examiner

*Primary Examiner*—Thai Tran
*Assistant Examiner*—Hung Q Dang
(74) *Attorney, Agent, or Firm*—Stein, McEwen & Bui, LLP

(57) ABSTRACT

An information storage medium in which speed information has been recorded, and a method of recording and/or reproducing data on the information storage medium. The information storage medium includes a reproduction-only area in which recording speed information and/or reproducing speed information which indicate whether a drive can record and/or reproduce data on the information storage medium are recorded. The method of recording and/or reproducing data in an information storage medium, the method includes: recording, as reproduction-only data in a reproduction-only area, recording speed information and/or reproducing speed information, which is used to indicate speed capabilities to a drive; and recording or reproducing data on the information storage medium when a recording speed or a reproducing speed capability of the drive matches the recording speed information or the reproducing speed information.

2 Claims, 6 Drawing Sheets

FIG. 2

| BYTE NUMBER | CONTENTS | NUMBER OF BYTES |
|---|---|---|
| 0 | TYPE AND VERSION NUMBER OF DISK (DVD, Ver1.0) | 1 |
| 1 | DISK SIZE (120mm) | 1 |
| 2 | DISK STRUCTURE (SINGLE LAYER) | 1 |
| 3 | REVISION NUMBER | 1 |
| 4 | . . . . | |
| 5 | RECORDING SPEED | 1 |
| 6 | REPRODUCTION POWER | 1 |
| 7 | . . . . | 1 |
| 8 | . . . . | 1 |
| 9 | . . . . | 1 |
| 10 | RESERVED | 1 |
| . . . . | . . . . | . . . . |

FIG. 3

| BYTE NUMBER | CONTENTS | NUMBER OF BYTES |
|---|---|---|
| 0 | TYPE AND VERSION NUMBER OF DISK (DVD, Ver1.0) | 1 |
| 1 | DISK SIZE (120mm) | 1 |
| 2 | DISK STRUCTURE (SINGLE LAYER) | 1 |
| 3 | MINIMUM RECORDING SPEED | 1 |
| 4 | MAXIMUM RECORDING SPEED | |
| 5 | MINIMUM REPRODUCING SPEED | 1 |
| 6 | MAXIMUM REPRODUCING SPEED | 1 |
| 7 | . . . . | 1 |
| 8 | . . . . | 1 |
| 9 | . . . . | 1 |
| 10 | RESERVED | 1 |
| . . . . | . . . . | . . . . |

FIG. 4A

| | 7b | 6b | 5b | 4b | 3b | 2b | 1b | 0b |
|---|---|---|---|---|---|---|---|---|
| THIRD BYTE | | | MAXIMUM | RECORDING | SPEED | | | |
| FOURTH BYTE | | | MINIMUM | RECORDING | SPEED | | | |
| FIFTH BYTE | | | MAXIMUM | REPRODUCING | SPEED | | | |
| SIXTH BYTE | | | MAXIMUM | REPRODUCING | SPEED | | | |

FIG. 4B

| | 7b | 6b | 5b | 4b | 3b | 2b | 1b | 0b |
|---|---|---|---|---|---|---|---|---|
| M | 1 x SPEED | 2 x SPEED | 3 x SPEED | 4 x SPEED | 5 x SPEED | 6 x SPEED | 7 x SPEED | 8 x SPEED |

INFORMATION STORAGE MEDIUM AND METHOD OF RECORDING AND/OR REPRODUCING DATA THEREON

CROSS REFERENCE TO RELATED APPLICATIONS

This application claims the priority of Korean Patent Application No. 2003-16497, filed on Mar. 17, 2003, in the Korean Intellectual Property Office, and the benefit of U.S. Provisional Patent Application No. 60/454,617, filed on Mar. 17, 2003, in the U.S. Patent and Trademark Office, the disclosures of which are incorporated herein in their entirety by reference.

BACKGROUND OF THE INVENTION

1. Field of the Invention

The present invention relates to an information storage medium and a method of recording and/or reproducing data thereon, and more particularly, to an information storage medium which contains speed information indicating whether a drive can record and/or reproduce data on the information storage medium, where the drive and the information storage medium are based on different versions of a standard, and a method of recording and/or reproducing data on the information storage medium.

2. Description of the Related Art

General information storage media is widely used as information recording media in optical pickup apparatuses for recording/reproducing information in a non-contact way. Optical disks, a type of information storage media, are classified as compact disks (CDs) or digital versatile disks (DVDs) according to their information storage capacity. Examples of recordable optical disks are 650MB CD-R, CD-RW, 4.7GB DVD+RW, and DVD-RAM. Furthermore, HD-DVDs having a recording capacity of 20 GB or greater are under development.

Standards for the physical structures or data structures of various types of storage media or standards for various methods of recording and/or reproducing data thereon are being established. The standards for storage media describe a great number of characteristics, particularly, recording capacity and recording speed. For example, if certain recording/reproducing conditions are required to increase the recording capacity and the conditions are different from those prescribed in an existing standard, the standard version number changes.

FIG. 1 shows the structure of a data area in a conventional recordable information storage medium, which includes a lead-in area 10, a user data area 20, and a lead-out area 30. The lead-in area 10 can be divided into a reproduction-only area and a recordable area. As shown in FIG. 1, the lead-in area 10 may include a first buffer zone 10-1, a disk control data zone 10-2, a disk test zone 10-3, a drive test zone 10-4, a defect management zone 10-5, a reserved zone 10-6, and a second buffer zone 10-7. For example, the first buffer zone 10-1 and the disk control data zone 10-2 are located in the reproduction-only area where data is recorded during the manufacture of a storage medium. The other zones are located in the recordable area.

FIG. 2 shows the data structure of the disk control data zone 10-2 which is comprised of a plurality of bytes. The type and version number of a disk are recorded in a zeroth byte, the size of the disk is recorded in a first byte, and the structure of the disk, for example, the number of data layers, is recorded in a second byte. However, information regarding recording speeds and/or reproducing speeds in drives that support old versions of a standard is not recorded.

When a standard version number is updated, recording/reproducing conditions are prescribed according to a new standard. In general, when the version number of a standard changes, a drive supporting a lower version cannot recognize a storage medium supporting the higher (i.e., a later) version. Hence, if the version number of a storage medium is different from that of a drive, recording and/or reproducing data may be impossible. However, although the version of a standard changes, some of the recording and/or reproducing speeds prescribed in the version of the revised standard may be compatible with some of the speeds prescribed in the older version of the standard. For example, if version 1.0 of the standard prescribes 1× to 4× recording speeds, and a new version 2.0 of the standard prescribes 3× to 8× recording speeds, a drive based on the version 1.0 of the standard can record and/or reproduce data on a storage medium based on the version 2.0 at 3× or 4× recording speed.

Since recording speed information is not recorded, a drive based on the version 1.0 standard is incapable of recognizing its ability to record and/or reproduce data on a storage medium based on the version 2.0 standard.

Accordingly, every time a standard changes, a new drive must be provided, thus resulting in economic waste.

BRIEF SUMMARY

The present invention provides an information storage medium in which information regarding supported speeds is recorded so that a drive based on an old version of a standard can record and/or reproduce data on a storage medium of an updated version of the standard, and a method of recording and/or reproducing data on the information storage medium.

According to an aspect of the present invention, there is provided an information storage medium including a reproduction-only area in which recording speed information and/or reproducing speed information which indicate whether a drive can record and/or reproduce data on the information storage medium are recorded.

The recording speed information and/or the reproducing speed information may be recorded in at least one byte of the reproduction-only area.

The storage medium may include a lead-in area, a user data area, and a lead-out area, and the recording speed information and/or the reproducing speed information may be recorded in a reproduction-only area formed in at least one of the lead-in and lead-out areas.

The recording speed information and/or the reproducing speed information may include maximum multiple speed data and minimum multiple speed data, the minimum multiple speed data may be recorded in an m-th byte of the reproduction-only area, and the maximum multiple speed data may be recorded in an n-th byte of the reproduction-only area.

The minimum multiple speed data may be recorded in the first four bits of the 8 bits of an m-th byte of the reproduction-only area, and the maximum multiple speed data may be recorded in the last four bits of the 8 bits of the m-th byte of the reproduction-only area.

According to another aspect of the present invention, there is provided a method of recording and/or reproducing data in an information storage medium. The method includes: recording, as reproduction-only data in a reproduction-only area, recording speed information and/or reproducing speed information, which is used to indicate speed capabilities to a drive; and recording or reproducing data on the information storage medium when a recording speed or a reproducing speed capability of the drive matches the recording speed information or the reproducing speed information.

According to still another aspect of the present invention, there is provided drive system for recording and/or reproducing data on an information storage medium including a pickup which records and/or reproduces data from an information storage medium comprising a reproduction-only area in which recording speed information and/or reproducing speed information which indicate whether a drive can record and/or reproduce data on the information storage medium are recorded. When the storage medium has been inserted into such a drive device, the drive device reads out the recording speed information and/or reproducing speed information and records and/or reproduces data according to a recording speed information and/or reproducing speed information.

According to another aspect of the present invention, there is provided a drive system for recording data on an information storage medium, including: an audio/video (AV) encoder which compresses an AV signal according to a specified compression scheme and outputs compressed AV data; a digital signal processor which receives the compressed AV data, adds data for electronic code correction (ECC) processing to the compressed AV data, modulates the resulting data according to a specified modulation scheme, and outputs modulated data; a radio frequency (RF) amplifier which converts the modulated data into an RF signal and outputs the RF signal; and a pickup which records the RF signal on the information storage medium. The data includes recording speed information and/or reproducing speed information.

According to still another aspect of the present invention, there is provided a drive system for reproducing data recorded on an information storage medium, including; a pickup which detects an optical signal from the information storage medium; a radio frequency (RF) amplifier which converts the optical signal into an RF signal of modulated data and outputs the RF signal; a digital signal processor which demodulates the modulated data according to a modulation scheme, performs error correction code (ECC) processing, and outputs compressed audio/video (AV); and an AV decoder which decodes the compressed AV data and outputs an AV signal. The data includes recording speed information and/or reproducing speed information.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which:

FIG. 2 shows the data structure of a disk control data zone included in the information storage medium of FIG. 1;

FIG. 3 shows the data structure of a disk control data zone included in an information storage medium according to an embodiment of the present invention;

FIGS. 4A through 4D are diagrams for explaining methods of recording speed information for use by a drive in an information storage medium according to an embodiment of the present invention;

DETAILED DESCRIPTION EMBODIMENTS

Figure 1:
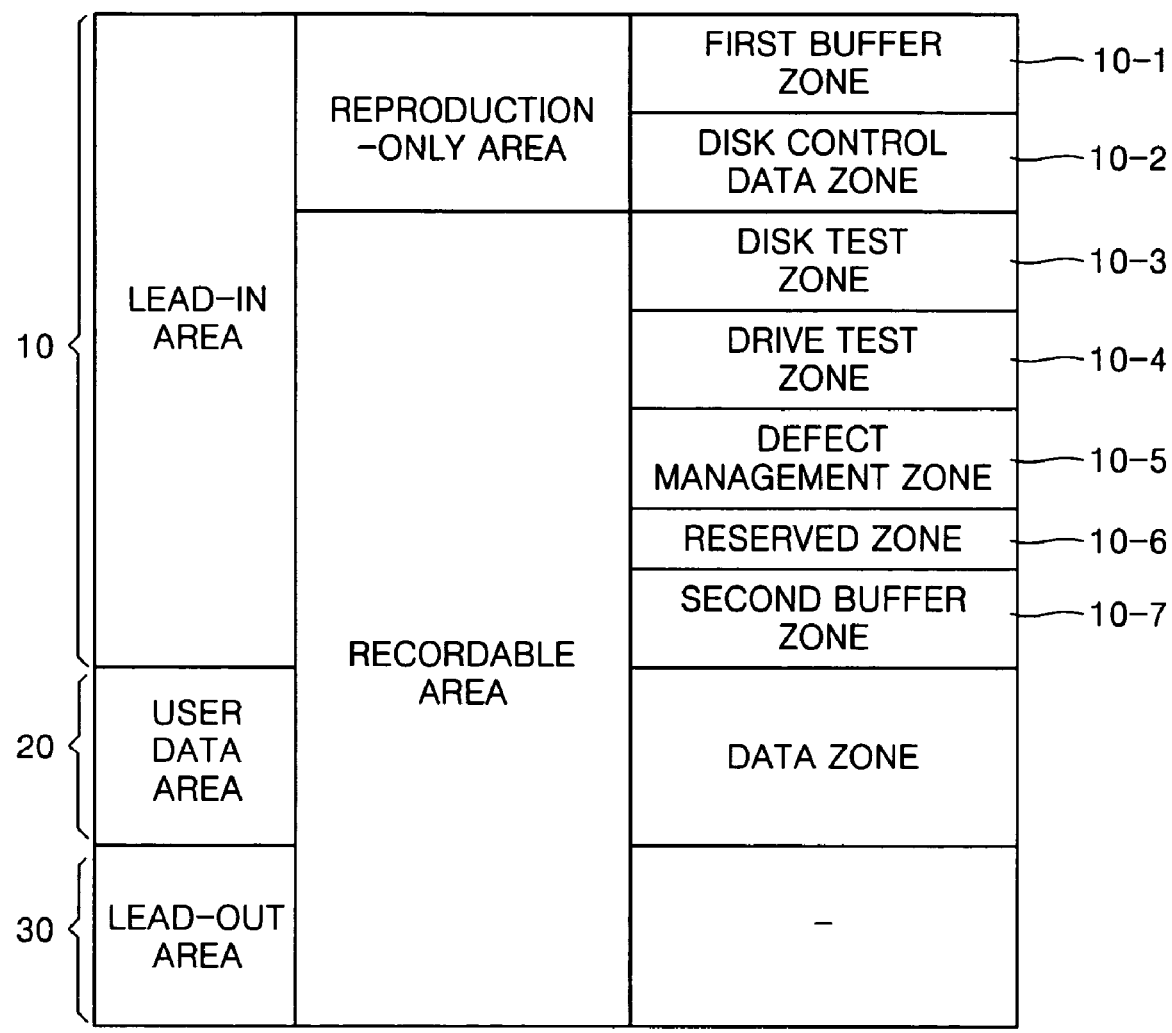
FIG. 1 shows the structure of a data area in a conventional recordable information storage medium.

Reference will now be made in detail to embodiments of the present invention, examples of which are illustrated in the accompanying drawings, wherein like reference numerals refer to the like elements throughout. The embodiments are described below in order to explain the present invention by referring to the figures.

An information storage medium according to an embodiment of the present invention and a method of recording and/or reproducing data thereon will now be described.

An information storage medium according to this embodiment of the present invention stores information regarding supported speeds so that a drive can detect whether it can record data on the information storage medium, where the drive is based on a standard different from the specified standard of the storage medium. Here, the specified standard denotes the standard followed by the storage medium, and the speed information serves as reproduction-only data and is recorded in a reproduction-only area of the storage medium. Hereinafter, the term speed information refers to information indicating speed capabilities to a drive (i.e., whether the drive can record and/or reproduce data on the information storage medium) and is based on a standard other than the specified standard.

Referring to FIG. 1, an information storage medium according to an embodiment of the present invention includes a lead-in area 10, a user data area 20, and a lead-out area 30. Speed information is recordable in a reproduction-only area of the lead-in area 10 and/or the lead-out area 30.

The lead-in area 10 is divisible into a reproduction-only area and a recordable area. The lead-in area 10 may include a first buffer zone 10-1, a disk control data zone 10-2, a disk test zone 10-3, a drive test zone 10-4, and a defect management zone 10-5. The lead-in area 10 may further include a reserved zone 10-6, where additional data is recordable, and a second buffer zone 10-7. For example, the first buffer zone 10-1 and the disk control data zone 10-2 are located in the reproduction-only area, and the other zones are located in a recordable area. Since the lead-out area 30 can be similarly constructed to the lead-in area 10, it will not be described in detail.

A standard version number and speed information are recordable as reproduction-only data upon the manufacture of the medium. The speed information can refer to recording speed information and/or reproducing speed information and is recordable in the form of pits or groove wobbles in the disk control data zone 10-2. A groove wobble denotes a groove formed in a wave shape.

As shown in FIG. 3, the disk control data zone 10-2 is comprised of a plurality of bytes. Speed information is recorded in at least one byte of the plurality of bytes of the disk control data zone 10-2. In FIG. 3, a minimum recording speed is recorded in a third byte, a maximum recording speed is recorded in a fourth byte, a minimum reproducing speed is recorded in a fifth byte, and a maximum reproducing speed is recorded in a sixth byte.

FIG. 4A shows an example in which speed data is recorded in the third through sixth bytes. One byte is comprised of 8 bits, which are zeroth through seventh bits (0b through 7b). As described above, there is a method of recording speed data in four bytes.

Alternatively, as shown in FIG. 4B, speed information is recorded in two bytes, for example, m-th and n-th bytes. Minimum multiple speed data is recordable in the m-th byte, and maximum multiple speed data is recordable in the n-th byte. Here, m and n may be consecutive numbers or discontinuous numbers. Also, the maximum multiple speed data is recordable in the m-th byte, and the minimum multiple speed data is recordable in the n-th byte. The minimum multiple speed data is the minimum recording speed data or minimum reproducing speed data. Conversely, the maximum multiple speed data is the maximum recording speed data or maximum reproducing speed data. The minimum multiple speed data and the maximum multiple speed data are written in a hexadecimal or binary format.

In another method of recording speed data, the speed data is recorded in a combination of the zeroth through seventh bits (b0 through b7) of an m-th byte. For example, 00000001b can indicate the ability for recording at 1× to 3× recording speeds, 00010001b can indicate the ability for recording at 2× to 6× recording speeds, and 00000011b can indicate the ability for recording at 2× to 8× recording speeds.

Figure 4C:
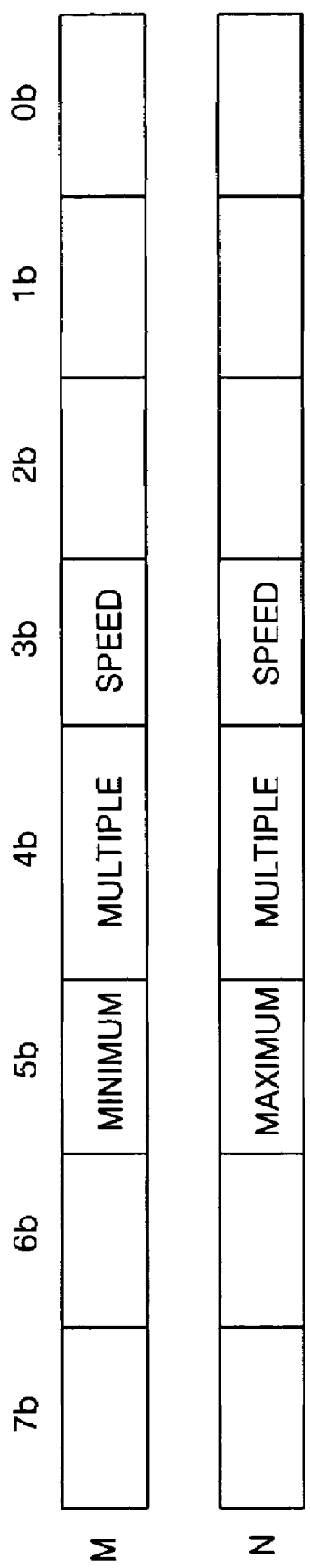
Figure 4D:
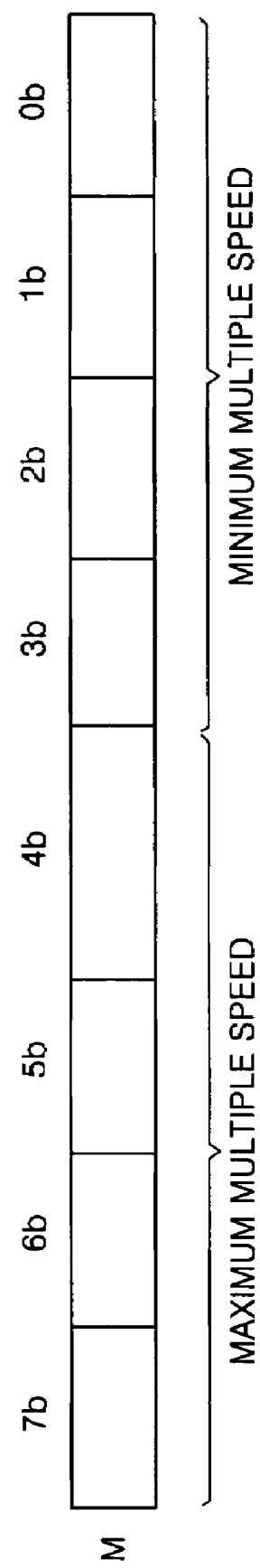

As shown in FIG. 4C, speeds are designated at the zeroth through seventh bits of the m-th byte, and data regarding these speeds is recordable in the corresponding bits. For example, the zeroth bit (0b) is allocated to indicate the capability for recording at a 1× recording speed, the first bit (1b) is allocated to indicate the capability for recording at a 2× recording speed, the second bit (2b) is allocated to indicate the capability for recording at a 3× recording speed, the third bit (3b) is allocated to indicate the capability for recording at a 4× recording speed, the fourth bit (4b) is allocated to indicate the capability for recording at a 5× recording speed, the fifth bit (5b) is allocated to indicate the capability for recording at a 6× recording speed, the sixth bit (6b) is allocated to indicate the capability for recording at a 7× recording speed, and the seventh bit (7b) is allocated to indicate the capability for recording at a 8× recording speed. A 0 recorded in one of the bits indicates data is recordable at the speed corresponding to that bit. However, a 1 recorded in one of the bits indicates data cannot be recorded at the speed corresponding to that bit. For example, 00001111b indicates that data is recordable at 1 through 4× recording speeds but cannot be recorded at 5 through 8× recording speeds.

Alternatively, the minimum multiple speed data is recordable in the first four bits of the zeroth through seventh bits of one byte, and the maximum multiple speed data is recordable in the last four bits. If 10000011b has been recorded, 1000 represents the minimum multiple speed data and 0011 represents the maximum multiple speed data. According to this method, recording speed data and reproducing speed data are recordable together. For example, the recording speed data is recordable in the m-th byte, and the reproduction speed data is recordable in the n-th byte. Maximum recording speed data is recorded in the seventh through fourth bits of the m-th byte, and minimum recording speed data is recorded in the third through zeroth bits thereof. Maximum reproducing speed data is recorded in the seventh through fourth bits of the n-th byte, and minimum reproducing speed data is recorded in the third through zeroth bits thereof.

In a method of recording and/or reproducing data on a storage medium according to an embodiment of the present invention, recording speed information and/or reproducing speed information is used to indicate speed capabilities to a drive, where the drive and the storage medium are based on different versions of a standard, is recorded on the storage medium, and is reproduced by the drive. If recorded speed information matches speeds at which the drive can record or reproduce data, then the drive can record or reproduce data on the storage medium.

The data recording and/or reproducing method according to an embodiment of the present invention is applicable to both recordable storage media and reproduction-only storage media.

When a storage medium of version 2.0 has been inserted into a drive of version 1.0, the drive reproduces the speed information recorded on the storage medium. If the speeds specified in the reproduced speed information match speeds at which the drive can record or reproduce data, then the drive can record or reproduce data on the storage medium, even though the versions of the drive and storage medium are different.

Figure 5:
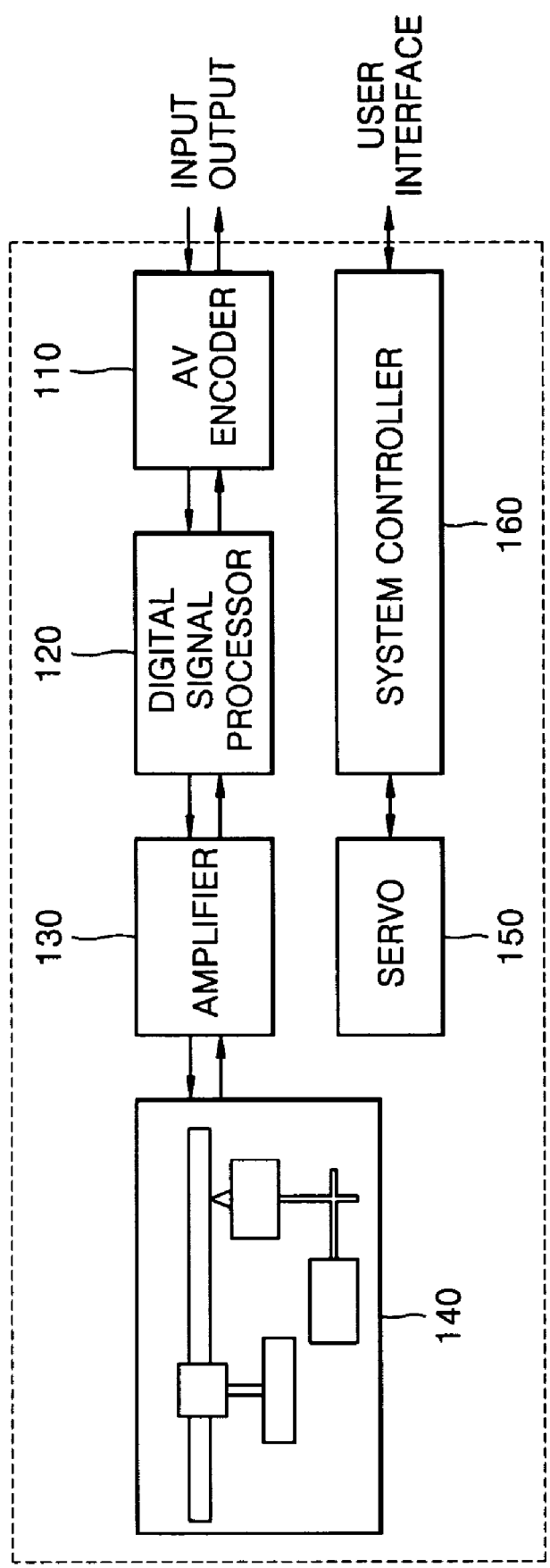
FIG. 5 is a block diagram of a drive device, which records and/or reproduces data on an information storage medium according to an embodiment of the present invention.

A drive device for recording and/or reproducing data on an information storage medium according to the present invention is shown in FIG. 5. Upon data recording, an audio/video (AV) encoder 110 compresses an AV signal according to a specified compression scheme and provides information about the size of compressed data. A digital signal processor 120 receives the compressed AV data from the AV encoder 110, adds data for ECC processing to the compressed AV data, and modulates the resulting data according to a specified modulation scheme. A radio frequency (RF) amplifier 130 converts the data modulated by the digital signal processor 120 into an RF signal. A pickup 140 records the RF signal received from the RF amplifier 130 on a disk, which is mounted on a turntable of the pickup 140. A servo 150 receives the data necessary for servo control from a system controller 160 and performs a servo function for the disk.

Upon reproduction of data recorded on the disk, the pickup detects an optical signal from the disk and extracts the recorded data from the optical signal. The RF amplifier 130 converts the optical signal into an RF signal and extracts and modulates a servo signal to perform a servo function. The digital signal processor 120 demodulates the modulated data, which is received from the RF amplifier 130, according to the modulation scheme used for data modulation, corrects any errors through an ECC process, and removes additional data from the recorded data. The servo 150 receives the data necessary for servo control from the system controller 160. The AV encoder 110 decodes the compressed AV data received from the digital signal processor 120 and outputs an AV signal. The system controller 160 controls the entire drive system to record or reproduce data on the disk, which is mounted on the turntable of the pickup.

When a storage medium according to the present invention has been inserted into such a drive device, the drive device reads out the speed information and records and/or reproduces data by referring to the read-out speed information. According to the data recording and/or reproducing method of the present invention, an existing drive can still record or reproduce data on a storage medium, even when the storage medium is based on a revised version of a standard.

Figure 6:
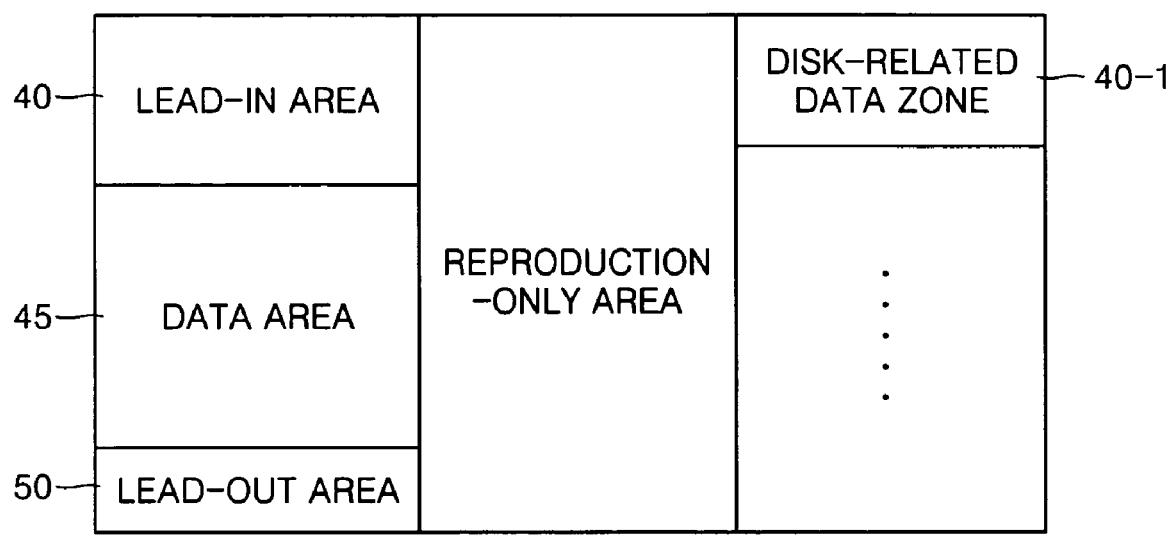
FIG. 6 shows the structure of a data area in a conventional reproduction-only information storage medium.

FIG. 6 shows the structure of a data area in a conventional reproduction-only information storage medium, which includes a lead-in area 40, a user data area 45, and a lead-out area 50. All of these areas are comprised of a reproduction-only area. Speed information is recorded in the disk-related data zone 40-1 included in the lead-in area 40 of the storage medium so that it is usable by a drive based on a standard other than the standard followed by the storage medium. The speed information is recordable according to such methods as those described above. The recording and/or reproducing method according to the present invention is also applicable to reproduction-only information storage media.

As described above, an information storage medium according to an embodiment of the present invention includes speed information for use by a drive based on a standard other than the standard followed by the information storage medium. Accordingly, even when a standard changes, an old drive is still usable. Since an old drive can record and/or reproduce data on an upgraded storage medium by using the speed information, using a new drive is unnecessary, and economy in expenditures can be achieved. Also, even when a standard changes, the old drive is compatible with an upgraded drive.

Although a few embodiments of the present invention have been shown and described, the present invention is not limited to the described embodiments. Instead, it would be appreciated by those skilled in the art that changes may be made in these embodiments without departing from the principles and spirit of the invention, the scope of which is defined by the claims and their equivalents.

What is claimed is:

1. A method of recording and/or reproducing data in an information storage medium, the method comprising:

recording, as reproduction-only data in a reproduction-only area, maximum recording speed information, minimum recording speed information, maximum reproducing speed information, and minimum reproducing speed information, which are used to indicate speed capabilities to a drive; and recording on the information storage medium when a recording speed capability of the drive is equal to or between the minimum speed recording information and the maximum recording speed information or reproducing data from the information storage medium when a reproducing speed capability of the drive is equal to or between the maximum reproducing speed information and the minimum reproducing speed information, wherein the maximum recording speed information, the minimum recording speed information, the maximum reproducing speed information, and the minimum reproducing speed information include maximum multiple speed data and minimum multiple speed data, the minimum multiple speed data being recorded in the first four bits of the 8 bits of an m-th byte of the reproduction-only area, and the maximum multiple speed data being recorded in the last four bits of the 8 bits of the m-th byte of the reproduction-only area.

2. A method of recording and/or reproducing data in an information storage medium, the method comprising:

recording, as reproduction-only data in a reproduction-only area, maximum recording speed information, minimum recording speed information, maximum reproducing speed information, and minimum reproducing speed information, which are used to indicate speed capabilities to a drive; and recording on the information storage medium when a recording speed capability of the drive is equal to or between the minimum speed recording information and the maximum recording speed information or reproducing data from the information storage medium when a reproducing speed capability of the drive is equal to or between the maximum reproducing speed information and the minimum reproducing speed information, wherein the maximum recording speed information, the minimum recording speed information, the maximum reproducing speed information, and the minimum reproducing speed information include maximum multiple speed data and minimum multiple speed data, the minimum multiple speed data being recorded in four bits of the 8 bits of an m-th byte of the reproduction-only area, and the maximum multiple speed data being recorded in four bits of the 8 bits of the m-th byte of the reproduction-only area.

* * * * *

UNITED STATES PATENT AND TRADEMARK OFFICE
CERTIFICATE OF CORRECTION

| | |
|---|---|
| PATENT NO. | : 7,526,185 B2 |
| APPLICATION NO. | : 10/798284 |
| DATED | : April 28, 2009 |
| INVENTOR(S) | : Kyung-geun Lee et al. |

It is certified that error appears in the above-identified patent and that said Letters Patent is hereby corrected as shown below:

Title Page, Item (56) References Cited, Other Publications, insert
--Office Action issued in Chinese Patent Application No. 200480001431.4 on November 10, 2006.--

Signed and Sealed this

Eighteenth Day of August, 2009

David J. Kappos
*Director of the United States Patent and Trademark Office*